US012383468B2

(12) United States Patent
Berger et al.

(10) Patent No.: US 12,383,468 B2
(45) Date of Patent: Aug. 12, 2025

(54) PHARMACEUTICAL COMPOUNDING SYSTEM AND METHOD

(71) Applicant: RESCUE DOSE LTD, Yokneam (IL)

(72) Inventors: Amir Berger, Kiryat Biyalik (IL); Eli Leshem, Ramat Efal (IL); Boris Rapoport, Haifa (IL); Gilad Einy, Haifa (IL)

(73) Assignee: Rescue Dose LTD, Yokneam (IL)

( * ) Notice: Subject to any disclaimer, the term of this patent is extended or adjusted under 35 U.S.C. 154(b) by 911 days.

(21) Appl. No.: 17/601,064

(22) PCT Filed: Mar. 22, 2020

(86) PCT No.: PCT/IB2020/052663
§ 371 (c)(1),
(2) Date: Oct. 3, 2021

(87) PCT Pub. No.: WO2020/201890
PCT Pub. Date: Oct. 8, 2020

(65) Prior Publication Data

US 2022/0202648 A1 Jun. 30, 2022

Related U.S. Application Data

(60) Provisional application No. 62/829,277, filed on Apr. 4, 2019.

(51) Int. Cl.

| | |
|---|---|
| ***A61J 1/20*** | (2006.01) |
| ***A61J 1/10*** | (2006.01) |
| ***B01F 23/50*** | (2022.01) |
| ***B01F 31/00*** | (2022.01) |
| ***B01F 33/84*** | (2022.01) |
| ***B01F 35/71*** | (2022.01) |
| *B01F 101/22* | (2022.01) |

(52) U.S. Cl.
CPC ............... *A61J 1/2096* (2013.01); *A61J 1/10* (2013.01); *A61J 1/201* (2015.05); *A61J 1/2055* (2015.05); *B01F 23/51* (2022.01); *B01F 23/551* (2022.01); *B01F 23/565* (2022.01); *B01F 31/00* (2022.01); *B01F 33/846* (2022.01); *B01F 35/7176* (2022.01); *B01F 2101/22* (2022.01)

(58) Field of Classification Search
CPC .......... A61J 1/2096; A61J 1/2055; A61J 1/10; B01F 35/7176; B01F 33/846; B01F 2101/22
See application file for complete search history.

(56) References Cited

U.S. PATENT DOCUMENTS 6,364,866 B1 4/2002 Furr et al.
2004/0087888 A1 5/2004 DiGianfilippo et al.
(Continued)

FOREIGN PATENT DOCUMENTS

WO WO-2005120692 A1 * 12/2005 .......... B01F 13/0818
WO 2015/016375 2/2015

*Primary Examiner* — Marc C Howell
(74) *Attorney, Agent, or Firm* — The Law Office of Joseph L. Felber

(57) ABSTRACT

A pharmaceutical compounding system includes a plurality of vials and a receptacle. The system is arranged to remove substances stored within the vials and combine them within the receptacle to form a medication, and each vial is continuously maintained gripped within the system during preparation of the medication.

14 Claims, 8 Drawing Sheets

(56) References Cited

U.S. PATENT DOCUMENTS

| | | | |
|---|---|---|---|
| 2006/0136095 | A1 | 6/2006 | Rob et al. |
| 2008/0169044 | A1 | 7/2008 | Osbourne et al. |
| 2009/0038709 | A1 | 2/2009 | VanVreeland et al. |
| 2012/0273087 | A1 | 11/2012 | Stavsky et al. |
| 2012/0282143 | A1 | 11/2012 | Marquis et al. |
| 2012/0325365 | A1 | 12/2012 | Strangis |
| 2014/0150379 | A1 | 6/2014 | Aguerre et al. |
| 2014/0157731 | A1 | 6/2014 | Perazzo et al. |
| 2016/0158105 | A1 | 6/2016 | Einy et al. |
| 2017/0151127 | A1 | 6/2017 | Einy et al. |
| 2017/0233113 | A9 | 8/2017 | Illarramendi et al. |
| 2017/0290993 | A1 | 10/2017 | Cowan et al. |
| 2018/0161244 | A1 | 6/2018 | Lopez et al. |

* cited by examiner

PHARMACEUTICAL COMPOUNDING SYSTEM AND METHOD

TECHNICAL FIELD

Embodiments of the invention relate to a pharmaceutical compounding system and method, in particular for combining a variety of ingredients.

BACKGROUND

Pharmaceutical compounding relates to procedures that are taken in order to form tailored medicines or drugs that are suited to address required therapeutic needs of a patient. Such procedures may include combining ingredients using various tools to form medications that may then be administered to patients in various ways, such as by intravenous (IV). In some cases, pharmaceutical compounding may be used to form pharmaceutical products that are specifically prescribed for an individual patient.

Automatic systems may be used e.g. in a hospital environment—in order to automatically compound IV syringes or bags. In some cases, robotic systems may be used in such systems for preparing e.g. sterile syringes for intravenous use based on orders received from a hospital pharmacy.

SUMMARY

The following embodiments and aspects thereof are described and illustrated in conjunction with systems, tools and methods which are meant to be exemplary and illustrative, not limiting in scope.

In an embodiment there is provided a pharmaceutical compounding system comprising a plurality of vials and a receptacle, the system being arranged to remove substances stored within the vials and combine them within the receptacle to form a medication, wherein each vial is continuously maintained gripped within the system during preparation of the medication.

Possibly the system comprises a pump member, for example a syringe, for assisting in the combining of substances for forming the medication.

In certain embodiments the pump member is continuously maintained gripped within the system during the combining of substances for forming the medication.

Possibly a holder is provided for gripping the pump member, wherein the holder is placed at a loading state within the system for initially loading the pump member to be gripped in the system.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1A:
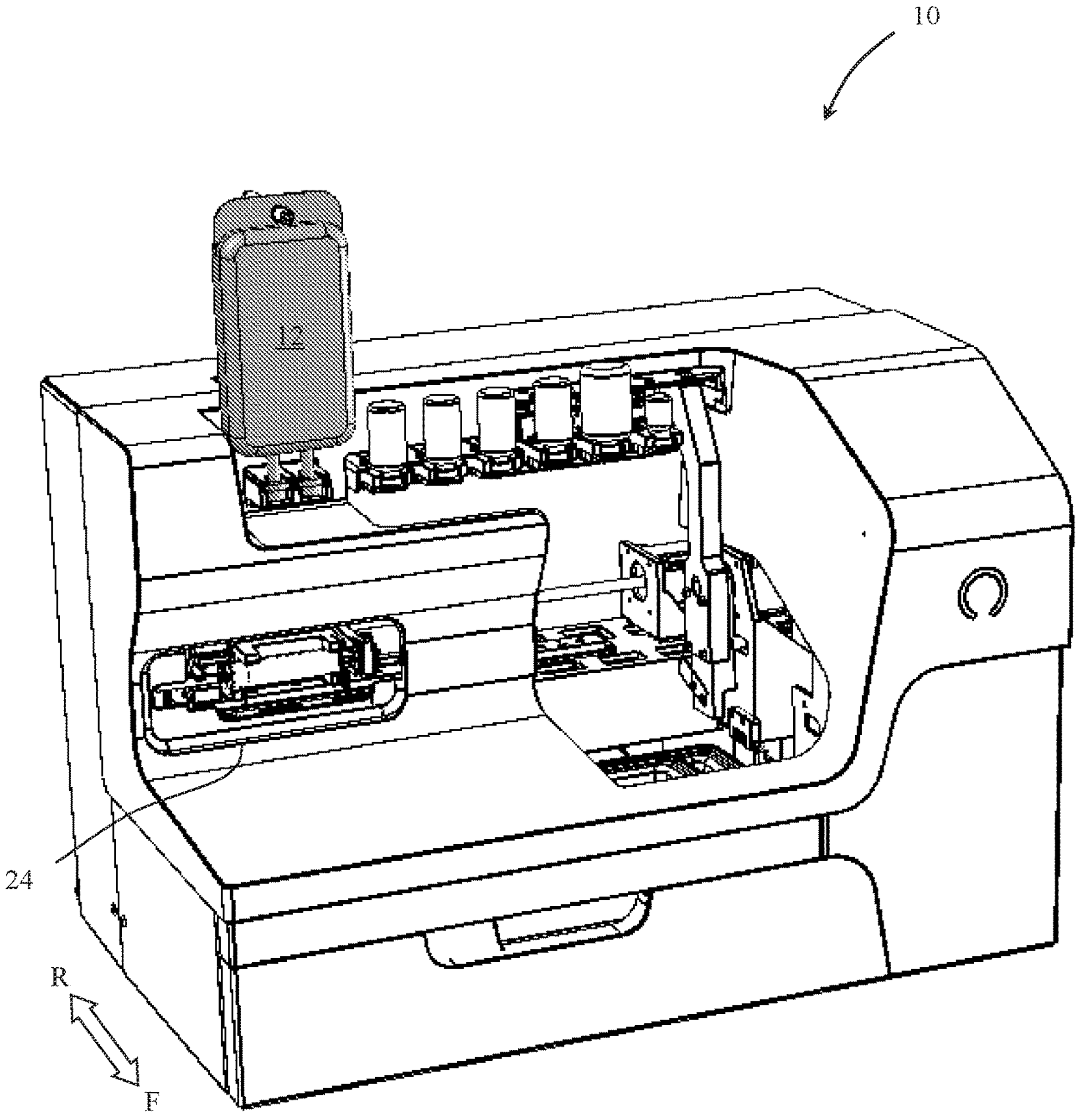
FIG. 1A schematically shows a perspective view of an embodiment of a pharmaceutical compounding system of the present invention in a home state.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1B:
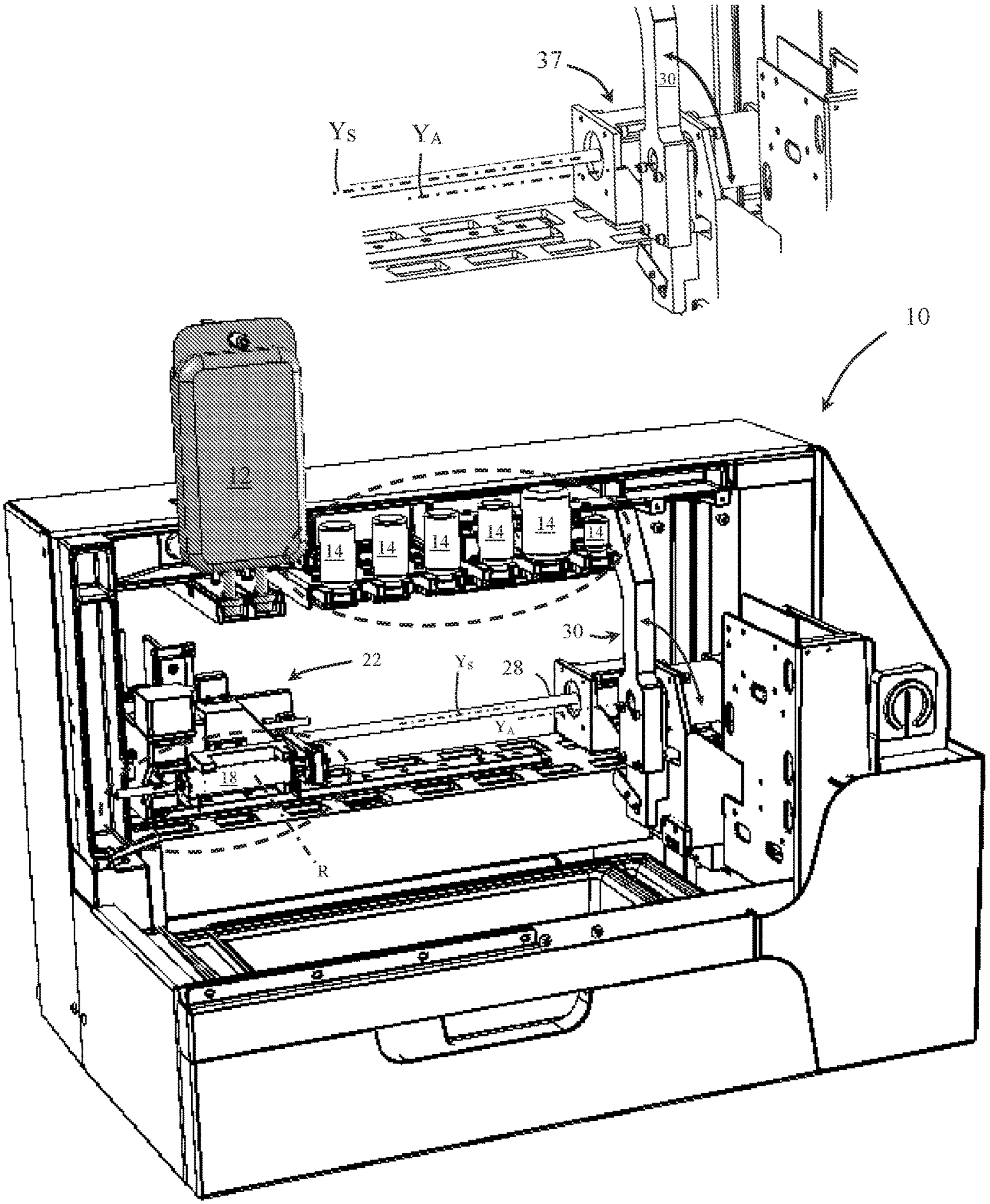
FIG. 1B schematically shows the pharmaceutical compounding system of FIG. 1A with a front covering removed partially revealing its interior.

Attention is first drawn to FIGS. 1A and 1B illustrating a possible embodiment of a pharmaceutical compounding system of the present invention. In FIG. 1B a portion of an outer housing of the system has been removed to reveal parts of the system's interior otherwise concealed.

Embodiments of pharmaceutical compounding systems of the present invention may be used in a variety of environments—such as in pharmacies e.g. a hospital pharmacy found within premises of a hospital (or the like). Embodiments of pharmaceutical compounding systems may be arranged to substantially automatically compound a receptacle suitable for administrating therapeutic substances.

Such receptacle may be an IV bag, an infusion bottle (or the like). In at least certain embodiments—such receptacles may be formed from relative resilient and/or expandable material arranged to deform and thereby permit ingress and/or egress of liquids without substantial formation of pressure variations within the receptacle that may otherwise interfere in such system(s) operations.

In some embodiments, a controller associated or comprised in such systems of the present invention—may be arranged to compound such a receptacle based on orders that may be received from a hospital pharmacy (or the like). In the system embodiments illustrated in the figures, such receptacle arranged to receive ingredients for possible later administration to a patient is indicated by numeral 12.

Figure 1C:
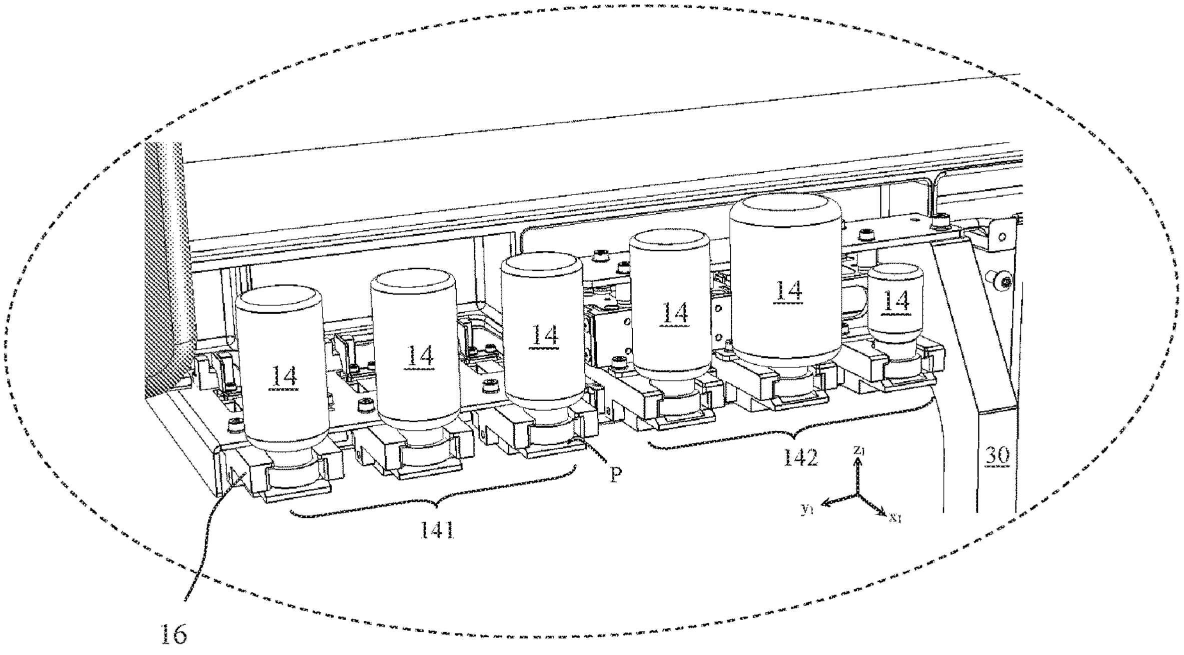
FIGS. 1C and 1D schematically show enlarged sections of the system of FIG. 1B.
Figure 1D:
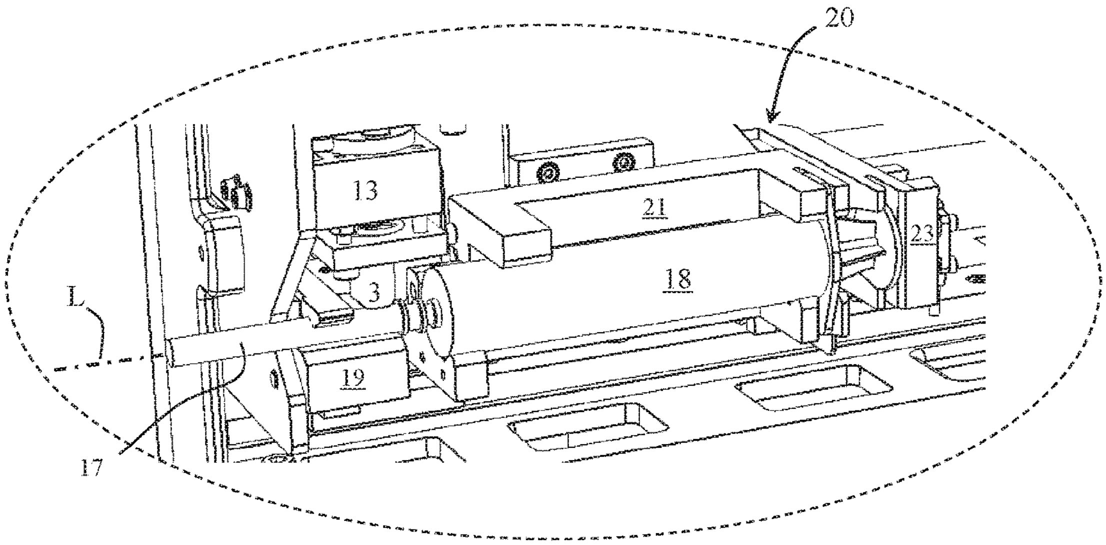

System 10 in the shown example may include one or more vials 14 (see e.g. enlarged view of FIG. 1C) that may be arranged to store liquids, powders (or the like). Vials 14 may be removably fitted, possibly manually by a technician such as a pharmacist, to respective docking sites 16 of the system that each define a docking plane P, and system 10 may in addition be seen (see e.g. FIG. 1D) as including a pump member 18, in the shown examples embodied as a syringe. Each vial may be arranged to include an opening possibly with a septum at one of its ends and vials may be gripped at docking sites 16 adjacent their openings, with each opening being possibly parallel to plane P of its docking site.

Syringe 18 may be fitted, possibly manually by a technician such as a pharmacist, to a holder 20 of the system—which in turn may be coupled to move together with a syringe manipulator 22. Mounting of the syringe to system 10 may preferably be at a "home" or "loading" state of the system—here exemplified by the system's holder being located at a relative left-hand side of the system. In the example provided in the figures, the syringe may be inserted via an opening 24 through the system's housing providing access towards holder 20 from a forward side of the system (see opening 24 and forward F and rear R directions marked in FIG. 1A).

Mounting of the syringe to its holder at the system's "loading" state may include coupling (e.g. by snap-fit) a removable cap 17 located on the syringe's needle to a cap clamp 19 of the system; and the syringe's barrel and plunger, respectively, to a base 21 and a sway member 23 of the holder. A fixation member 13 may be controlled to urge a fixation shaft 3 to engage against cap 17 to securely hold onto the cap after loading of a new syringe to the system. The syringe may be seen having an axial extension along an axis L and sway member 23 may be controlled in this example via manipulator 22 to axially move back and forth long axis L in relation to base 21 in order to ingress or egress substances into or out of the syringe.

System 10 may include a lateral extending slide 28 that extends along a lateral extending axis $Y_S$ generally parallel to a ground face. Slide 28 in this example may be embodied as a slide screw coupled to an actuator 37 (see actuator 37 and axes $Y_S$ and $Y_A$ marked in the enlarged view at the upper side of FIG. 1B). Actuator 37 may be controlled to rotate slide 28 and by that urge syringe manipulator 22 to move together with holder 20 and consequently the syringe along axis $Y_S$.

In addition, manipulator 22 may be controlled to rotate holder 20 about a rotational axis R extending generally forwardly and perpendicular to axis $Y_S$—and further in addition, manipulator 22 may be controlled to move holder 20 along a direction generally parallel to axis L.

Syringe at the "loading" state may be arranged with its axis L generally parallel to a ground face and to axis $Y_S$—and moving the syringe away from the "loading" state may include a 'first' initial step of urging syringe manipulator 22 along axis $Y_S$ together with the syringe in a direction away from clamp 19 and fixation member 13 that maintain cap 17 caught therein consequently exposing the needle of the syringe.

Vials 14 within system 10 may include liquid or dry (e.g. powder) type ingredients. In certain embodiments, as those shown, system 10 may be arranged to group vials according to their ingredient type within the system. In the embodiments shown (see e.g. FIG. 1C), system 10 may be seen being arranged to include first and second groups 141, 142 of vials. The first and second groups 141, 142 may include vials suitable for housing liquid type ingredients, while the second group 142 may include vials suitable for housing dry type ingredients.

Figure 4:
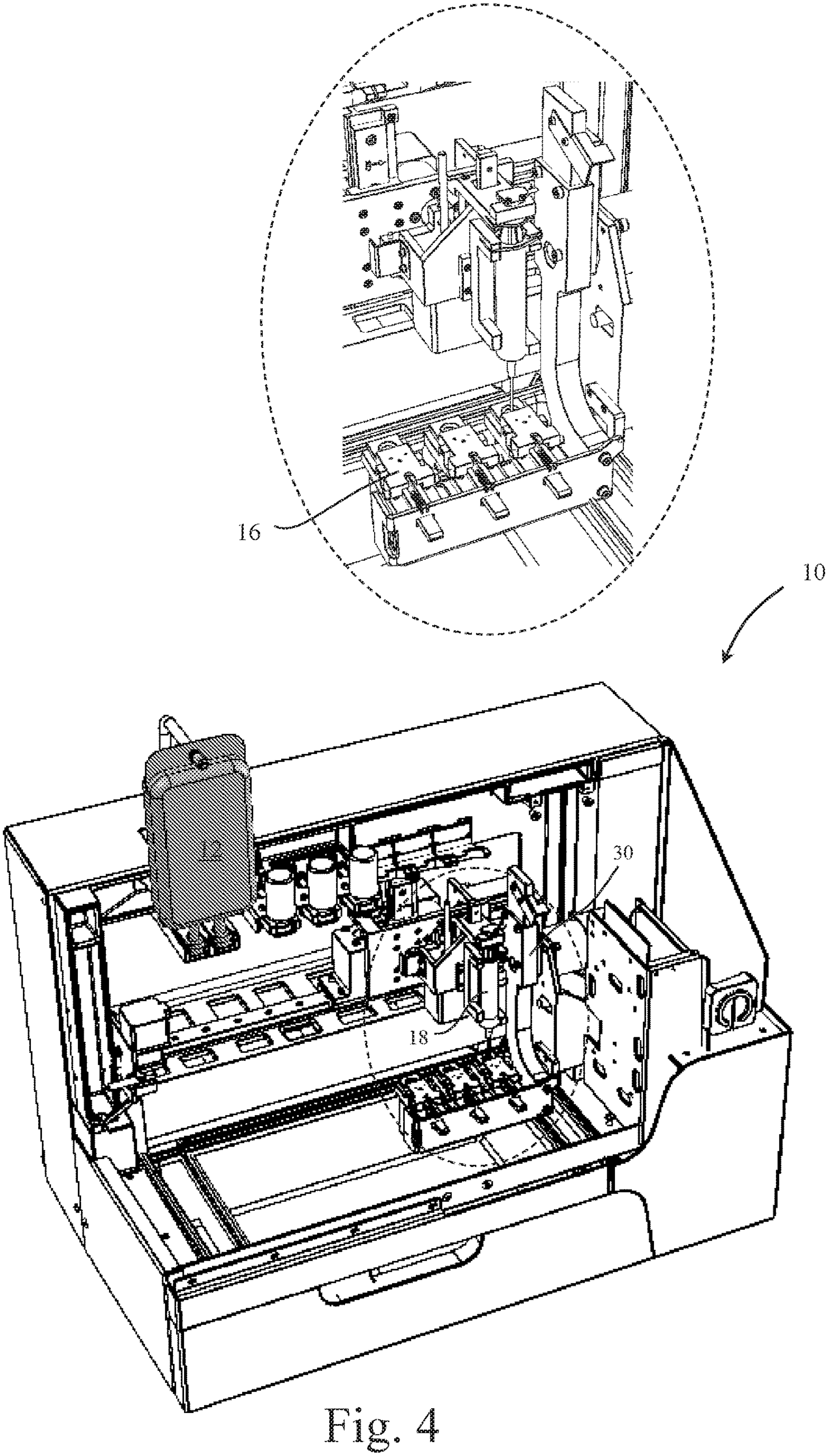

Vials of the first group 141 may be substantially fixed in location within the system, in this example with each vial's opening facing downwards. Vials within the second group 142 may be coupled to a pivot arm 30 that is adapted to rotate about an axis $Y_A$ that is generally parallel to axis $Y_S$. In FIG. 4 the system is shown in a state where arm 30 pivoted by about 180 degrees about axis $Y_A$ to position the vials of the second group 142 with their opening's facing up, while in the remainder of the figures the system is shown in a state where the opening of each vial in second group 142 faces down. In certain embodiments, arm 30 may be urged to the position seen in FIG. 4 for the purpose of disposing the vials gripped to it (possibly into drawer 100)—while preferably such disposal takes place after the substances stored in these vials have been utilized for forming a medication.

Figure 2:
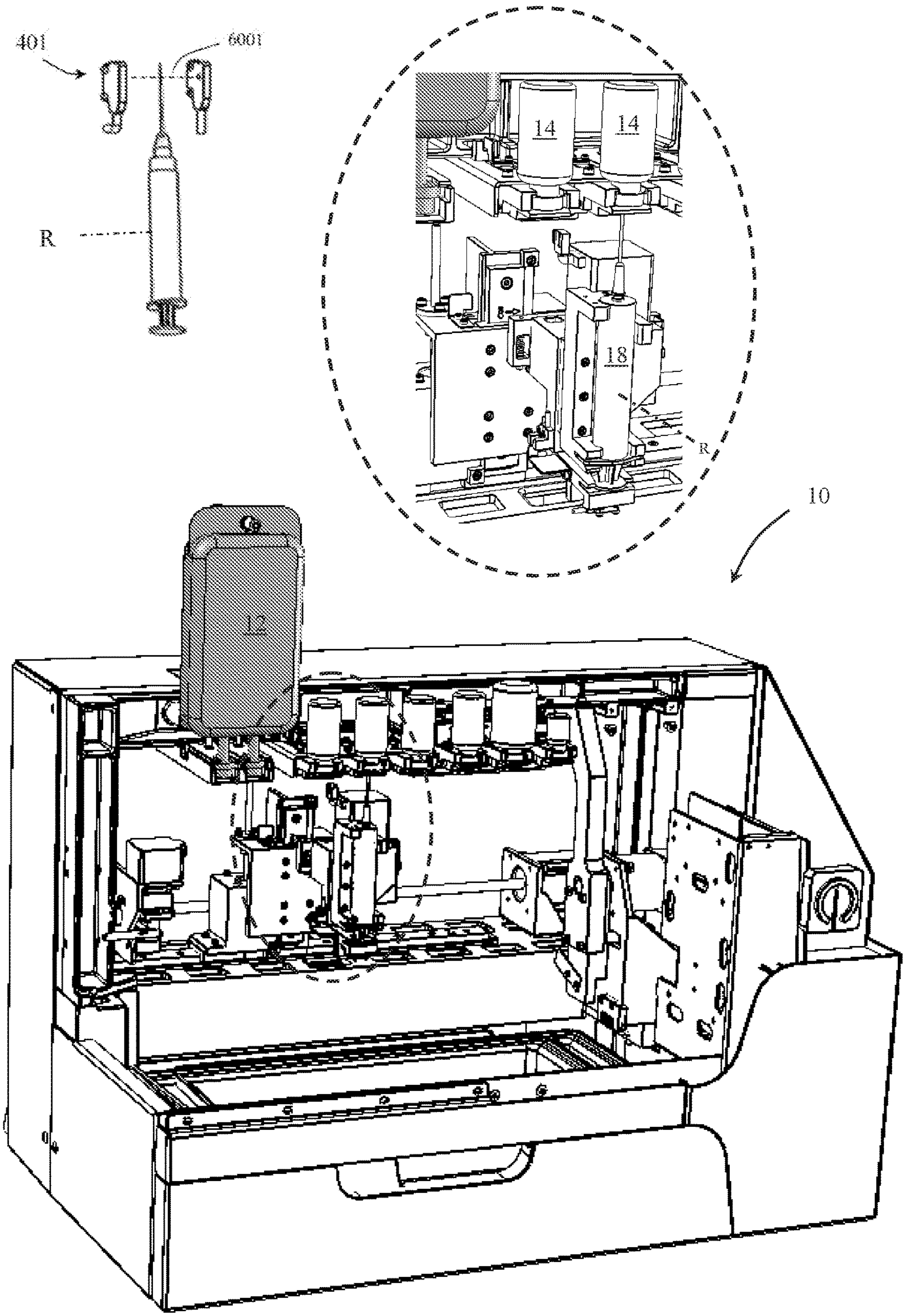
FIGS. 2 to 5 schematically show the system of FIG. 1 in various different states or operation.

Attention is drawn to FIG. 2 exemplifying a possible state of the system where syringe has been moved to a position suitable for drawing substances out of one of the vials within group 141. Movement of the syringe, for example, from the "loading" state seen in FIG. 1 towards the position seen in FIG. 2 may include the 'first' initial step of drawing the needle out of the cap—and then combined linear and/or rotational movements along axes $Y_S$, L and about axis R.

Attention is drawn to the upper left-hand side of FIG. 2 illustrating a possible calibration procedure that may be taken prior to penetrating an opening of a vial with a syringe's needle. In certain cases, e.g. due to a faulty needle that may be slightly angled to a syringe's axis L—calibrating the exact location of the needle's tip may assist in successfully advancing into a vial via its opening.

Such calibration may be performed e.g. by means of a calibration apparatus, such as calibration apparatus 401 exemplified at the upper left-hand side of FIG. 2. Calibration apparatus 401 may include a transmitter that transmits a signal 6001 (possibly an optical signal) and a receiver for receiving the signal. A syringe guided to position its needle below a vial's opening, may be guided to intercept signal 6001 to ensure that the needle is correctly orientated to enter the vial via its opening.

In an embodiment, calibration apparatus 401 and consequently signal 6001 me be arranged to detect correct placement of the needle about axis R. Detection of correct placement of a needle about axis R, in at least certain embodiments, may be obtained by directing signal 6001 along an axis generally parallel to axis R.

Once intercepting signal 6001—a possible "correction value" may be derived defining an 'angular correction' that rotation about axis R may take into consideration in order to suitably "aim" a needle of a given syringe within the system—to successfully enter or penetrate into an aperture, entry or opening such as of the vial.

Such "correction value" may be taken into consideration when urging rotation of the syringe about axis R—so that correct orientation of the needle may be obtained within the system. Such correct orientation may be useful when advancing the syringe's needle also into or towards additional locations within the system, such as if attempting to insert the syringe's needle back into its cap 17. A calibration apparatus such as 401 may be fitted at a location beneath and/or adjacent docking site(s) 16 of a certain vial or more than one vial within the system.

Figure 3:
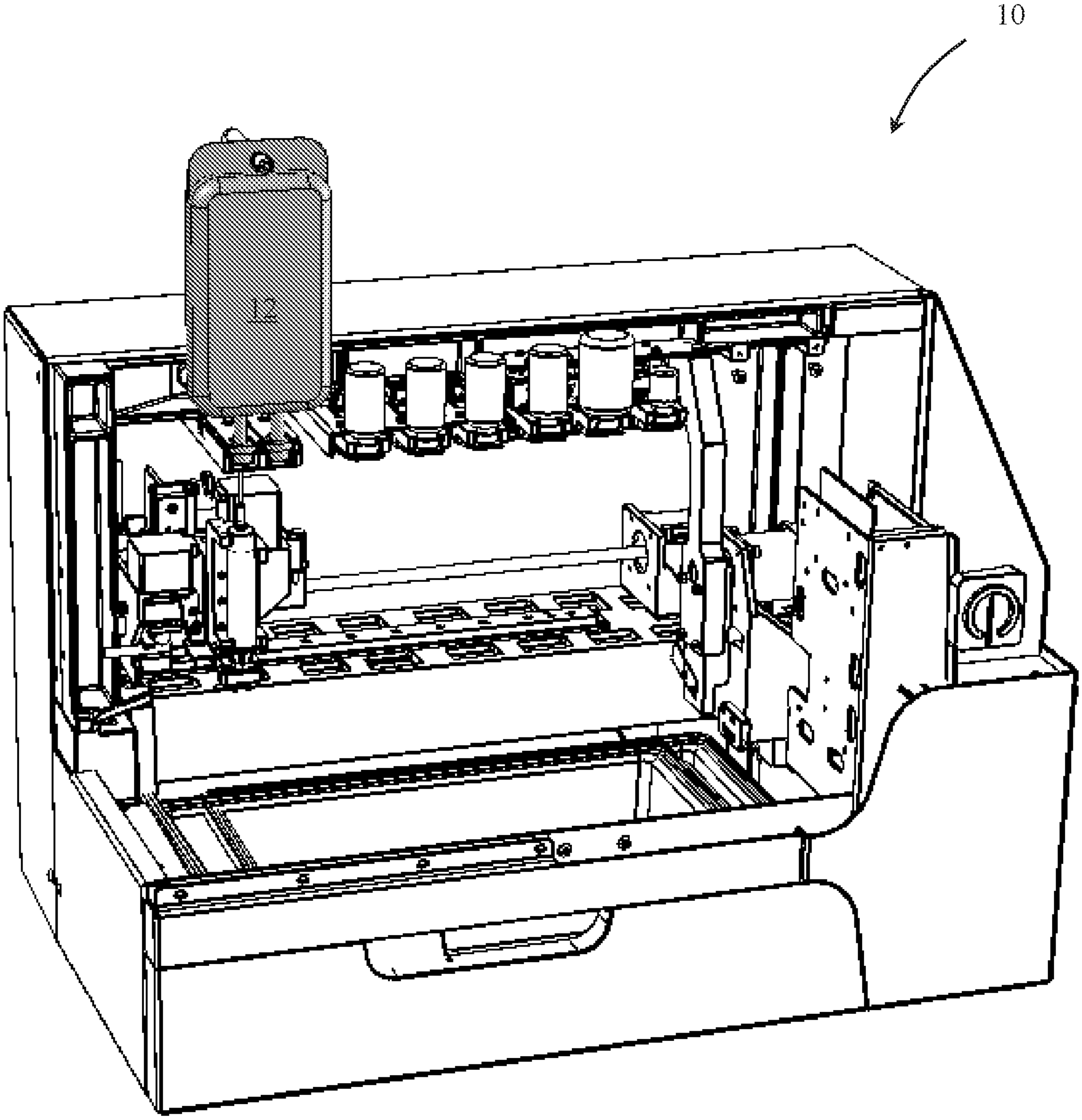

After drawing substances from one or more vials, the syringe may be advanced as seen in FIG. 3 to release the substances into the receptacle. In some cases, substance quantities drawn out of the vials (of either group 141 or 142) and inserted into receptacle 12 may be specifically prescribed for an individual patient that may then receive his prescribed treatment e.g. by intravenous therapy or the like.

Obtaining substances from vials of group 142, which in this example include dry ingredients—may include a reconstitution process of adding a diluent to a dry ingredient to make it a liquid. In the embodiments here shown—this may be accomplished by first advancing the syringe to draw a dose of liquid from the receptacle as seen in FIG. 3.

The syringe may then be advanced towards the vials of group 142—which may in turn be urged to a position suitable for receiving liquid from the syringe. Such position in the illustrated examples may include rotating the vials via arm 30 by about 180 degrees—to position the opening's of these vials facing generally upwards—as seen in FIG. 4. The syringe may then be advanced with its needle facing generally downwards to penetrate and emit liquid into one or more vials within group 142.

In at least certain embodiments, the system may include vibrators associated e.g. with each vial within group 142 in order to promote reconstitution processes within vials that receive liquid. In certain embodiments, such vibrators may be fitted in adjacent communication and/or proximity with docking sites 16 where vials attach. For example, in some examples, docking sites may be placed above vibrators. Vibrators may be arranged to urge vibrational movements in several directions, e.g. along all axes of a Cartesian coordinate system such as x1,y1,z1 marked in FIG. 1C where e.g. plane x1,y1 may be generally parallel to plane P of a vibrated docking site.

Figure 5:
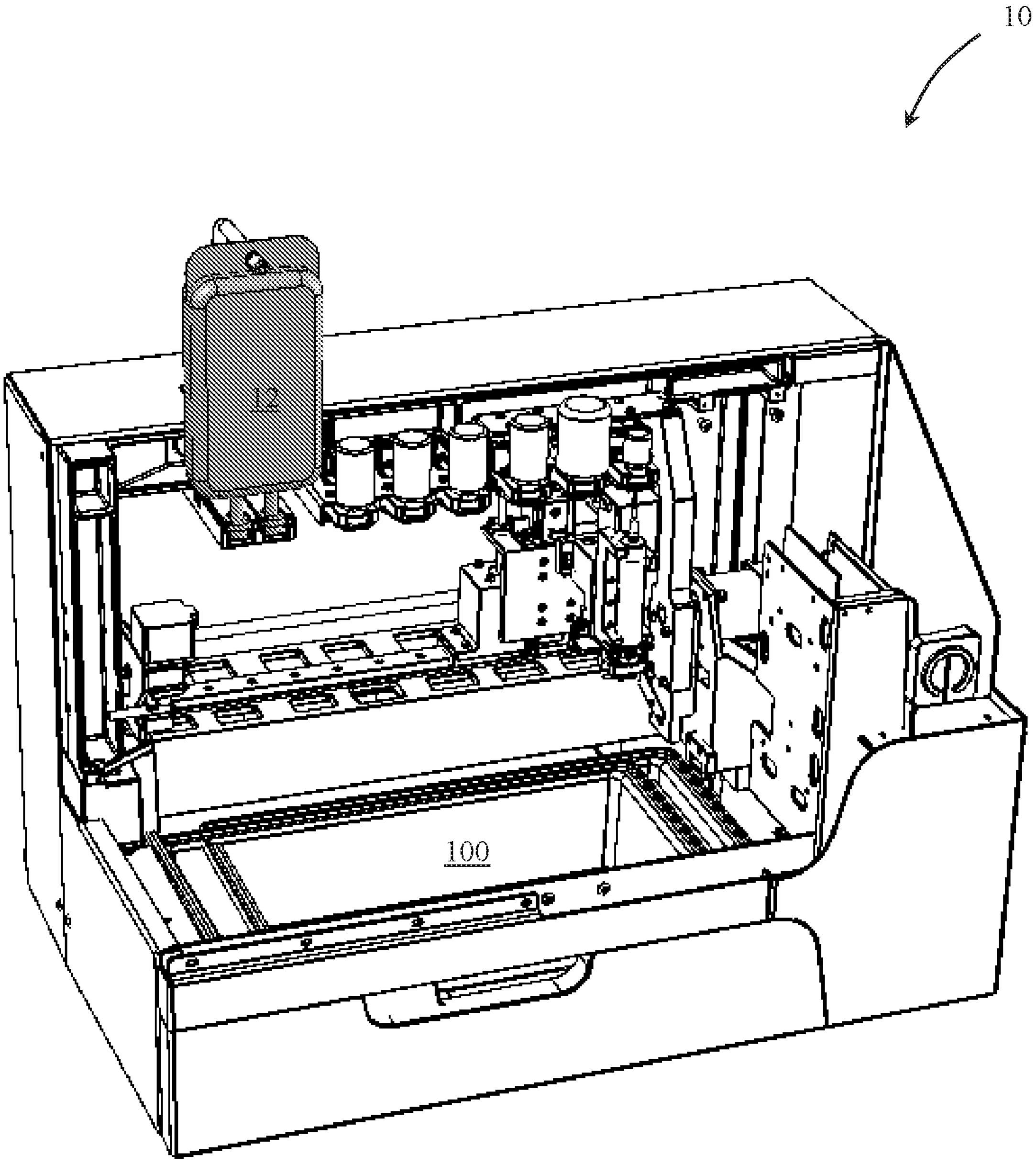

After receiving liquid within the required vials of group 142—arm 30 may be urged to rotate the vials of group 142 back upwards to a position where their opening's face generally downwards. The vibrator(s) may be activated to promote reconstitution processes in vials of group 142 also during the upward pivoting of arm 30. After or during pivoting of the vials of group 142 back upwards, the syringe may be advanced as seen in FIG. 5 to draw substances from the vials previously filled with liquid—and then advance to emit these substances into receptacle 12. Possibly, different vials may be vibrated according to different vibration parameters. For example different vibration parameters may be defined according to vials size, type of substance within a vial (etc.).

After compounding a receptacle with required dosages of substances from the vials—and/or if the vials fitted within the system are no further needed—the system may discharge the vials to a collecting container 100 possibly in the form of a drawer from which the empty vials may be disposed.

Figure 6:
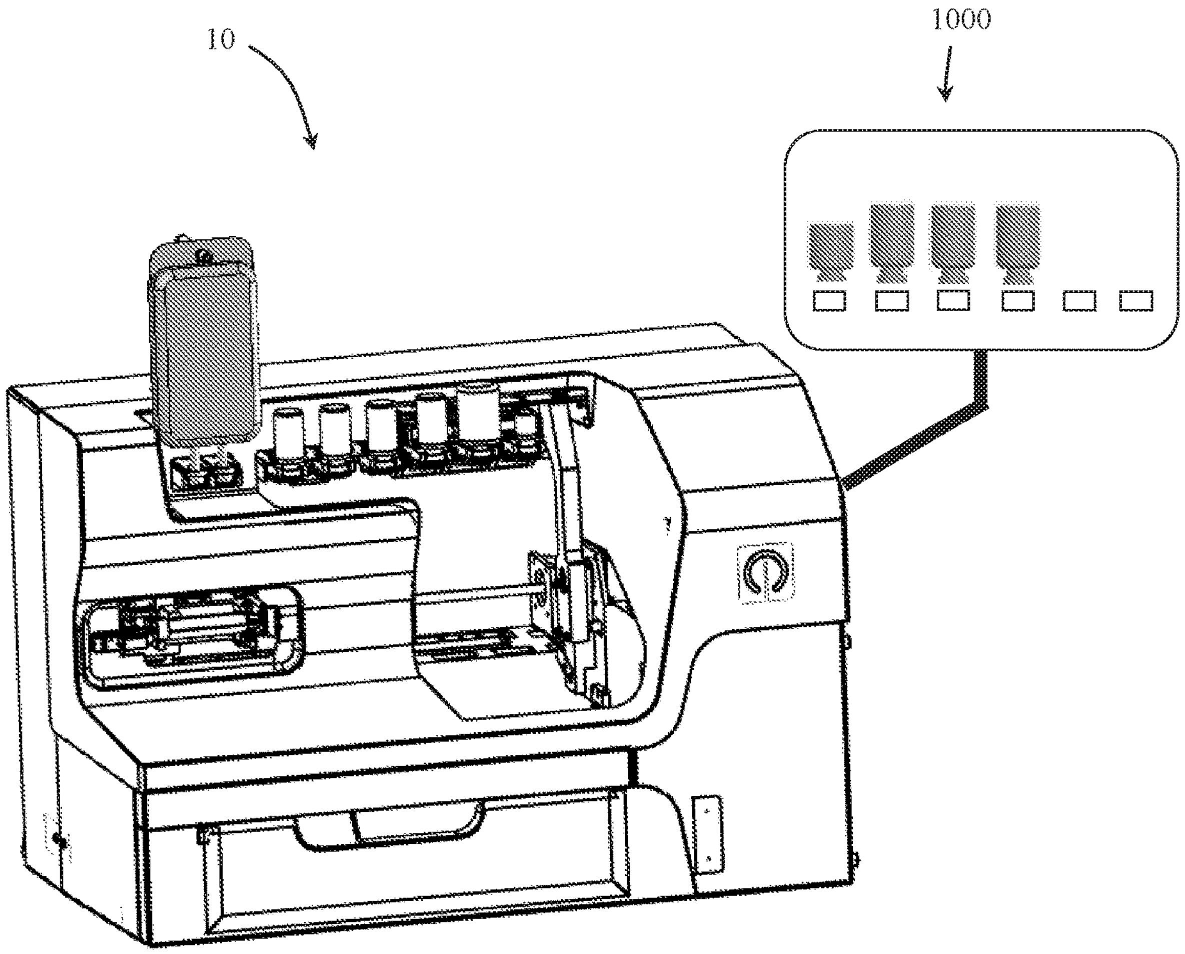
FIG. 6 schematically shows a pharmaceutical compounding system generally similar to those in the former figures exemplifying a GUI for assisting in setting up and operating the system.

Attention is drawn to FIG. 6 illustrating a pharmaceutical compounding system generally similar to those discussed in the former embodiments herein—here exemplifying provision of a GUI 1000 in communication and/or in association with the system for assisting in setting up and/or operating the system.

GUI 1000 may present based on specific patient information and/or required medication—a required loading arrangement for vials within the system. GUI may clearly indicate where to place each vial, in this example indicating to place four vials in the four first docking sites from left to right. The indications provided in the GUI may additionally point to the type of medication or ingredients within each vial to ensure correct placement of vials according to their medication within the system.

Additional means for assisting in correct placement of vials within the system may include LED indications e.g. adjacent docking sites within the system—marking where to place each vial and/or sensors such as barcode readers that may be arranged to detect barcodes placed on vials that are mounted to the system—to ensure that the correct vial has been loaded in its intended docking site in the system.

Parameters that may be provided to a processor that controls correct compounding by a system of a variety of ingredients according to a required prescription for a given patient may include: syringe size or type, needle type mounted on the syringe, ingredients to be used according to the prescription (and the like). Data relating to syringe type or size may be used e.g. for correctly guiding a syringe through the system, such as correctly placing the system's holder in the loading state so that the syringe can be easily fitted into its place without interference from other parts within the system.

Data relating to needle type may e.g. assist in determining suitable rates for drawing substances out of vials or the receptacle that substantially avoid drawing also air from within such vials or receptacle together with the drawn liquid substances. For example, a relative thick needle with a relative wide internal lumen may permit drawing substances at higher rates than a relative thin needle with a relative thinner internal lumen.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. A pharmaceutical compounding system comprising a plurality of vials and a receptacle, the system being arranged to withdraw substances stored within the plurality of vials to be emitted within the receptacle to form a medication, the system including a plurality of docking stations suitable for gripping the vials to which the vials are removably fitted and in which the vials are maintained gripped within the system during withdrawal, emitting, and preparation of the medication, and wherein at least one of the vials stores liquid substances and at least one other vial stores powder substances, and wherein the vial storing liquid substances is maintained substantially fixed in place within the system and the system being automated to move the vial storing powder within the system while being continuously gripped.

2. The system of claim 1, and comprising a syringe for assisting in the withdrawing and emitting of substances for forming the medication, and wherein the syringe is continuously maintained gripped within the system during withdrawing and emitting of substances for forming the medication.

3. The system of claim 2 and comprising a holder for gripping the syringe, wherein the holder is placed at a loading state within the system for initially loading the syringe to be gripped in the system, and wherein loading the syringe to the system at the loading state comprises gripping a cap located on a needle of the syringe within the system, and wherein urging the syringe away from the loading state comprises removing the needle from within the cap.

4. The system of claim 2, wherein the syringe being arranged to move within the system along at least one axial linear axis and about at least one rotational axis.

5. The system of claim 1, wherein the receptacle being suitable for later administration of the medication to a patient.

6. The system of claim 1 and being automated to move the vials storing powder between positions where their opening's face generally downwards and positions where their opening's face generally upwards.

7. The system of claim 6 and being configured prior to movement of the vials storing powder to lock said vials storing powder to respective docking stations suitable for gripping the vials.

8. The system of claim 7 and comprising one or more vibrators for vibrating vials storing powder.

9. The system of claim 8, wherein the vials are continuously maintained gripped within the system also during vibration.

10. A method for combining a variety of substances in a pharmaceutical compounding system, the substances being either a liquid or a powder, the method comprising the steps of:

providing a pharmaceutical compounding system comprising a syringe, a plurality of vials, and at least one receptacle, at least one of the vials storing a liquid and at least one of the vials storing a powder, urging the syringe to draw substances from at least one of the vials, and emitting substances drawn out of the at least one vial into the receptacle to form a medication, wherein the drawing of substances from the at least one vial storing a powder comprises:

first moving said at least one vial storing a powder from an initial position where its opening faces generally down to a position where its opening faces generally up, and then urging the syringe to draw liquid from the receptacle and emit at least part of this liquid into the at least one vial storing powder when it is oriented with its opening facing generally up in order to form a reconstitution process in said at least one vial that was storing powder.

11. The method of claim 10, wherein drawing substances from the at least one vial storing a liquid comprises moving the syringe towards the the at least one vial to draw a liquid out of the at least one vial and then moving the syringe to emit the liquid into the receptacle, while the at least one vial storing a liquid remains all along substantially fixed in place in the system.

12. The method of claim 10, wherein drawing substances from the at least one vial storing a powder comprises urging the vial back towards a position where its opening faces generally down after undergoing a reconstitution process in said vial.

13. The method of claim 10 and comprising, wherein the vials storing liquid and powder are grouped according to type of substance stored therein, and wherein the system comprising at least one vibrator arranged for vibrating vials of a type storing powder.

14. The method of claim 10 and comprising a GUI for assisting in setting up and operating the system, wherein the GUI is arranged to present, based on specific patient information and/or required medication, a required loading arrangement for the vials within the system, wherein after finishing to form the medication, the vials and/or the syringe gripped within the system are released from their grip.

* * * * *